(12) United States Patent
Louhghalam et al.

(10) Patent No.: US 11,346,677 B2
(45) Date of Patent: May 31, 2022

(54) METHOD TO MEASURE ROAD ROUGHNESS CHARACTERISTICS AND PAVEMENT INDUCED VEHICLE FUEL CONSUMPTION

(71) Applicants: UNIVERSITY OF MASSACHUSETTS, Boston, MA (US); MASSACHUSETTS INSTITUTE OF TECHNOLOGY, Cambridge, MA (US)

(72) Inventors: Arghavan Louhghalam, North Dartmouth, MA (US); Mazdak Tootkaboni, North Dartmouth, MA (US); Franz-Josef Ulm, Cambridge, MA (US)

(73) Assignees: University of Massachusetts, Boston, MA (US); Massachusetts Institute of Technology, Cambridge, MA (US)

( * ) Notice: Subject to any disclaimer, the term of this patent is extended or adjusted under 35 U.S.C. 154(b) by 14 days.

(21) Appl. No.: 16/769,040

(22) PCT Filed: Dec. 4, 2018

(86) PCT No.: PCT/US2018/063783
§ 371 (c)(1),
(2) Date: Jun. 2, 2020

(87) PCT Pub. No.: WO2019/113022
PCT Pub. Date: Jun. 13, 2019

(65) Prior Publication Data
US 2021/0223053 A1    Jul. 22, 2021

Related U.S. Application Data

(60) Provisional application No. 62/594,132, filed on Dec. 4, 2017.

(51) Int. Cl.
*G01C 21/34* (2006.01)
*G01C 21/00* (2006.01)
(Continued)

(52) U.S. Cl.
CPC ......... *G01C 21/3461* (2013.01); *G01B 21/30* (2013.01); *G01C 7/04* (2013.01); *G01C 21/3822* (2020.08)

(58) Field of Classification Search
None
See application file for complete search history.

(56) References Cited

U.S. PATENT DOCUMENTS 9,139,204 B1 * 9/2015 Zhao ................... B60W 40/068
10,285,141 B1 * 5/2019 Carver ..................... H04Q 9/04
(Continued)

FOREIGN PATENT DOCUMENTS

| CN | 104233935 A1 | 11/2007 |
|---|---|---|
| DE | 4213222 A1 | 10/1993 |

(Continued)

OTHER PUBLICATIONS

Alessandroni; "A Study on the Influence of Speed on Road Roughness Sensing: The SmartRoadSense Case"; Feb. 2017; Sensors 17(2):305; pp. 1-20; https://doi.org/10.3390/s17020305 (Year: 2017).*

(Continued)

*Primary Examiner* — David P. Merlino
(74) *Attorney, Agent, or Firm* — Renner, Otto, Boisselle & Sklar, LLP

(57) ABSTRACT

A method of monitoring quality of a road segment from driver data is provided. The method includes receiving, by a server over a network, the driver data for a road segment from one or more sensing units in one or more vehicles. The method also includes calculating, in one or more computing devices, one or more quantitative pavement surface charac- (Continued)

teristics of the road segment from the driver data using a probabilistic inverse analysis framework. The method also includes identifying, in the one or more computing devices, one or more quantitative vehicle properties of the one or more vehicles from the driver data using the probabilistic inverse analysis framework. The method then includes estimating, in the one or more computing devices, one or more road quality characteristics of the road segment based on at least one of the quantitative pavement surface characteristics of the road segment and the quantitative vehicle properties of the one or more vehicles.

17 Claims, 4 Drawing Sheets

(51) Int. Cl.
 *G01B 21/30* (2006.01)
 *G01C 7/04* (2006.01)

(56) References Cited

U.S. PATENT DOCUMENTS

| | | | |
|---|---|---|---|
| 2007/0262855 | A1 | 11/2007 | Zuta et al. |
| 2008/0082347 | A1 | 4/2008 | Villalobos et al. |
| 2011/0264300 | A1 | 10/2011 | Tuononen |
| 2015/0032373 | A1 | 1/2015 | Ikari |
| 2015/0183440 | A1 | 7/2015 | Jackson |
| 2015/0356796 | A1* | 12/2015 | Jackson ............... H04L 67/12 701/32.3 |
| 2016/0076991 | A1* | 3/2016 | Diamond ............. G08G 1/012 73/146 |
| 2016/0258118 | A1 | 9/2016 | Jinno et al. |
| 2016/0275409 | A1 | 9/2016 | Veerasamy |
| 2016/0280224 | A1* | 9/2016 | Tatourian ........... B60W 30/143 |
| 2017/0001639 | A1* | 1/2017 | Dempsey ......... B60W 50/0097 |
| 2017/0166019 | A1* | 6/2017 | Singh ................. B60C 23/0408 |
| 2017/0297580 | A1* | 10/2017 | Hanatsuka ........... G08G 1/0141 |
| 2018/0215391 | A1* | 8/2018 | Chen .................... G01N 33/42 |
| 2018/0218596 | A1* | 8/2018 | Castelli ............ G08G 1/096741 |
| 2019/0056224 | A1* | 2/2019 | Wessels ................. G01C 7/04 |
| 2020/0139976 | A1* | 5/2020 | Magnusson ........... G01C 21/32 |
| 2020/0249038 | A1* | 8/2020 | Nashed ................ G06K 9/6297 |

FOREIGN PATENT DOCUMENTS

| | | |
|---|---|---|
| DE | 102015010576 A1 | 3/2016 |
| EP | 2687818 A2 | 6/2013 |

OTHER PUBLICATIONS

Chen; "CRSM: Crowdsourcing Based Road Surface Monitoring," 2013 IEEE 10th International Conference on High Performance Computing and Communications & 2013 IEEE International Conference on Embedded and Ubiquitous Computing, 2013, pp. 2151-2158, doi: 10.1109/HPCC.and.EUC.2013. (Year: 2013).*

Chen; "Road condition monitoring using on-board Three-axis Accelerometer and GPS Sensor," 2011 6th International ICST Conference on Communications and Networking in China (CHINACOM), 2011, pp. 1032-1037, doi: 10.1109/ChinaCom.2011.6158308. (Year: 2011).*

Trupia; "Rolling resistance contribution to a road pavement life cycle carbon footprint analysis" Oct. 2016; Int J Life Cycle Assess 22, 972-985; https://doi.org/10.1007/s11367-016-1203-9 (Year: 2016).*

González; "The use of vehicle acceleration measurements to estimate road roughness"; 2008; Vehicle System Dynamics; 46:6, 483-499; DOI: 10.1080/00423110701485050 (Year: 2008).*

International Search Report and Written Opinion for Corresponding International Application No. PCT/US2018/063783 dated Feb. 11, 2019.

Extended European Search Report Corresponding Application No. 18886556.2 dated Jul. 19, 2021.

* cited by examiner

METHOD TO MEASURE ROAD ROUGHNESS CHARACTERISTICS AND PAVEMENT INDUCED VEHICLE FUEL CONSUMPTION

PRIOR APPLICATION DATA

This application is a national phase of International Application No. PCT/US2018/063783 filed Dec. 4, 2018 and published in the English language, which claims priority to 62/594,132 filed Dec. 4, 2017, both of which are hereby incorporated herein by reference.

TECHNICAL FIELD

The present invention relates to a method of monitoring road quality, and more particularly, to estimating road quality characteristics and road quality-induced environmental impact.

BACKGROUND

Roadway networks are one of the main backbones of economic growth worldwide. Maintaining roadways at a good condition costs the United States, for example, more than one hundred billion dollars annually. Road surface roughness is one of the main factors when federal and state agencies make maintenance decisions, as road surface roughness affects ride quality and comfort and may contribute to damage to freight and goods, affecting a large number of people driving on roads. Additionally, road surface roughness is an important contributor to vehicle fuel consumption and various corresponding environmental impacts, such as, for example, greenhouse gas emission.

Various qualitative road condition metrics have been used in the past by researchers and practitioners for monitoring road conditions, however these metrics have limited scope and are neither effective in providing a sufficient quantitative measure of road quality nor quantitatively estimating the various environmental impacts. Road roughness power spectral density (PSD), on the other hand, is a very detailed and quantitative metric for road surface roughness that, due to its richness of information, is very effective for many quantitative applications, such as ride quality measurements and fuel efficiency estimations. Existing methods for measuring road roughness PSD, however, require laser instrumented cars for measuring road profile characteristics. Such methods are very costly and unaffordable for many local agencies and cities.

SUMMARY

The present invention is directed toward a less costly method of monitoring road surface quality by providing pertinent quantitative road surface roughness data that may be used by local agencies and cities, for example, in making maintenance decisions, along with many other quantitative applications. The method of monitoring road quality of the present invention uses ubiquitous sensing and communication technology to provide real-time calculation and identification of quantitative pavement surface characteristics and vehicle properties in order to estimate various road quality characteristics, including ride quality and roughness-induced energy consumption for any given pavement section. The related environmental impact of a vehicle driving on the given pavement section may also be estimated.

The estimations are based on a plurality of independent and redundant measurements (via crowdsourcing) of acceleration and/or geolocation data ("driver data") of a plurality of vehicles in real-time. Such measurements may be measured with, for example, cell-phones having sensors such as accelerometers and GPSs, within vehicles, without any instrumentation, such as laser scanners or profilometers, on the vehicles themselves. The method of the present invention, therefore, enables quality monitoring of roadways and roadway systems in urban and rural areas with a significant increase in measurement coverage, potentially covering any area where cell-phones and cars are used. The method of the present invention may also achieve a significant reduction in cost and improvement of accuracy through the use of a large number of independent and equivalent measurements from various sensing units within various vehicles.

As the method of the present invention provides a low-cost alternative to the costly existing roughness measurement methods and instruments, the present invention may be of particular interest to various markets and consumers including, but not limited to, governmental agencies interested in an effective and low-cost monitoring system to help optimize maintenance strategies, industries that are interested in measuring fuel consumptions and/or greenhouse gas (GHG) emissions for product development or other purposes, and transportation companies interested in optimizing their routes for trip quality, minimizing damage to goods, and improving fuel efficiency.

In a first aspect of the invention, there is provided a method of monitoring quality of a road segment from driver data. The method includes receiving, by a server over a network, the driver data for a road segment from one or more sensing units in one or more vehicles. The method also includes calculating, in one or more computing devices, one or more quantitative pavement surface characteristics of the road segment from the driver data using a probabilistic inverse analysis framework. The method also includes identifying, in the one or more computing devices, one or more quantitative vehicle properties of the one or more vehicles from the driver data using the probabilistic inverse analysis framework. The method then includes estimating, in the one or more computing devices, one or more road quality characteristics of the road segment based on at least one of the quantitative pavement surface characteristics of the road segment and the quantitative vehicle properties of the one or more vehicles.

In an embodiment of any paragraph(s) of this summary, the estimating the one or more road quality characteristics comprises calculating the International Roughness Index for the road segment, and the one or more road quality characteristics includes ride quality.

In another embodiment of any paragraph(s) of this summary, the estimating the one or more road quality characteristics includes calculating an energy dissipation of the one or more vehicles driving on the road segment, and the one or more road quality characteristics includes excess fuel consumption.

In another embodiment of any paragraph(s) of this summary, the one or more road quality characteristics is estimated via a mechanics-based estimator in the one or more computing devices.

In another embodiment of any paragraph(s) of this summary, the method further includes estimating, in the one or more computing devices, one or more environmental impacts of the one or more vehicles driving on the road segment based on the one or more estimated pavement surface characteristics of the road segment and the one or more estimated vehicle properties.

In another embodiment of any paragraph(s) of this summary, the estimating the one or more environmental impacts includes estimating an excess $CO_2$ emission of the one or more vehicles caused by driving on the road segment.

In another embodiment of any paragraph(s) of this summary, the one or more environmental impacts is estimated via an environmental impact estimator in the one or more computing devices.

In another embodiment of any paragraph(s) of this summary, the method further includes reporting at least one of the one or more road quality characteristics, the one or more environmental impacts, the one or more quantitative pavement surface characteristics, and the one or more quantitative vehicle properties.

In another embodiment of any paragraph(s) of this summary, the probabilistic inverse analysis framework is a mechanistic-Bayesian inverse analysis framework.

In another embodiment of any paragraph(s) of this summary, the one or more quantitative pavement surface characteristics includes road roughness PSD of the road segment.

In another embodiment of any paragraph(s) of this summary, the driver data comprises one or more of vertical acceleration data and geolocation data.

In another embodiment of any paragraph(s) of this summary, the one or more sensing units comprises one or more of an accelerometer and a GPS sensor.

In another embodiment of any paragraph(s) of this summary, the receiving the driver data includes gathering the driver data in a crowd-sourced collaborative system in the server.

In another embodiment of any paragraph(s) of this summary, the method further includes using at least one of the one or more road quality characteristics, the one or more environmental impacts, the one or more quantitative pavement surface characteristics, and the one or more quantitative vehicle properties to make a road maintenance decision.

In another embodiment of any paragraph(s) of this summary, the method further includes using at least one of the one or more road quality characteristics, the one or more environmental impacts, the one or more quantitative pavement surface characteristics, and the one or more quantitative vehicle properties for product development purposes.

In another embodiment of any paragraph(s) of this summary, the method further includes using at least one of the one or more road quality characteristics, the one or more environmental impacts, the one or more quantitative pavement surface characteristics, and the one or more quantitative vehicle properties to optimize a transportation route.

In a second aspect of the invention, a system for carrying out a method of monitoring quality of a road segment from driver data is provided.

In a third aspect of the invention, a non-transitory computer-readable medium for carrying out functions of the method of monitoring quality of a road segment from driver data is provided.

DETAILED DESCRIPTION

Figure 1:
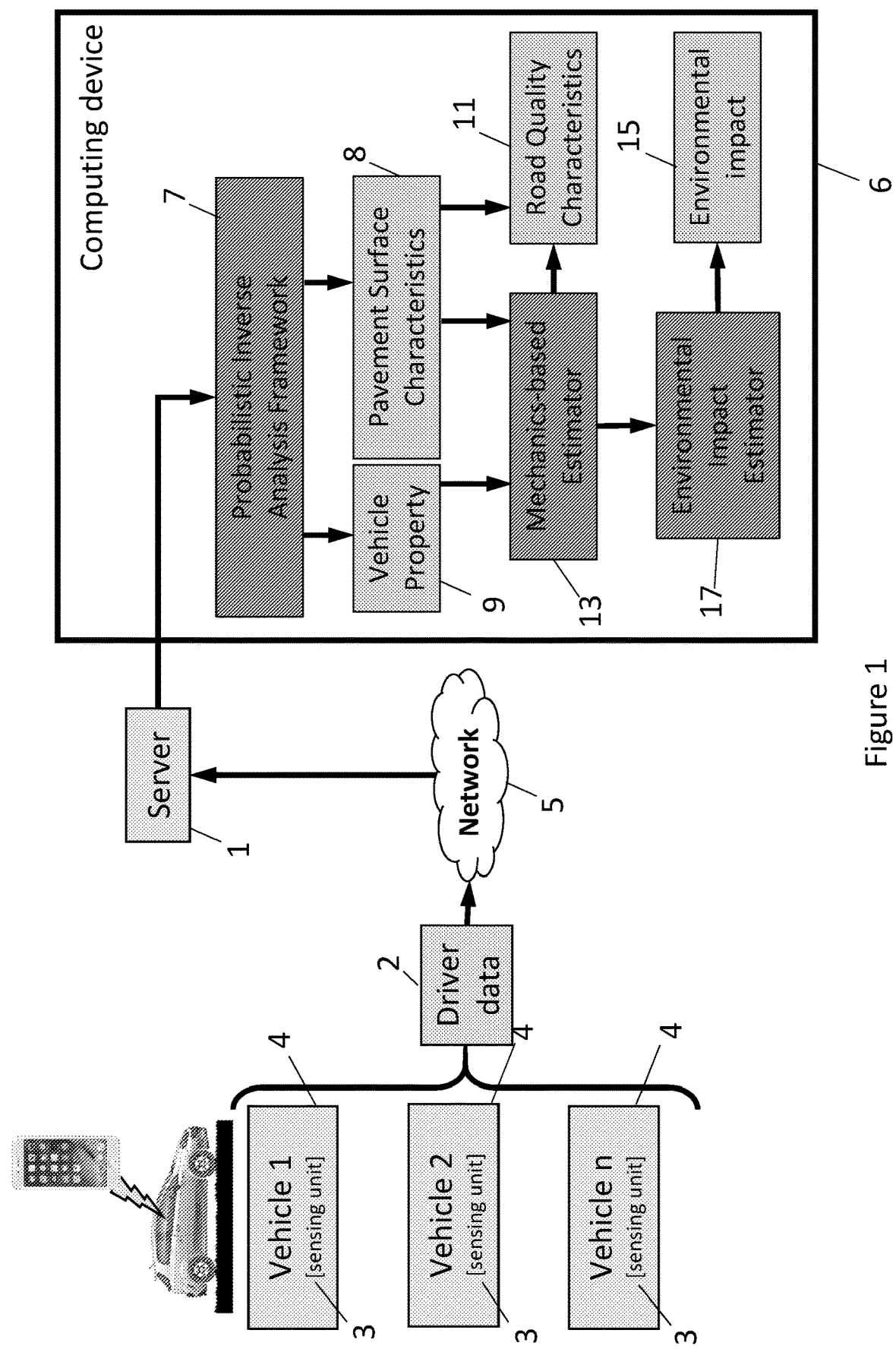
FIG. 1 is a schematic diagram illustrating components involved in a method of monitoring quality of a road segment from driver data.

With reference to FIG. 1, a schematic diagram illustrating various components involved in a method 19 of monitoring road surface quality is provided. As depicted, driver data 2 from one or more vehicles 4 driving on a road segment, is sensed and recorded for each of one or more vehicles 4. The driver data 2 may be, for example, vertical acceleration data of the vehicle 4 as it is driven over the road segment or geolocation data of the vehicle 4. The driver data 2 may be sensed by a sensing unit 3 within the vehicle 4. For example, the sensing unit 3 may be part of a smartphone or other electronic device located within the vehicle. For the method 19, there is no need for special instrumentation of the vehicle itself. For example, the sensing unit 3 may be an accelerometer or GPS sensor programmed on the electronic device. The driver data 2 may then be recorded and stored in a memory of the electronic device. The electronic device is configured to send the driver data 2 over a wireless network 5 to a server 1.

Figure 2:
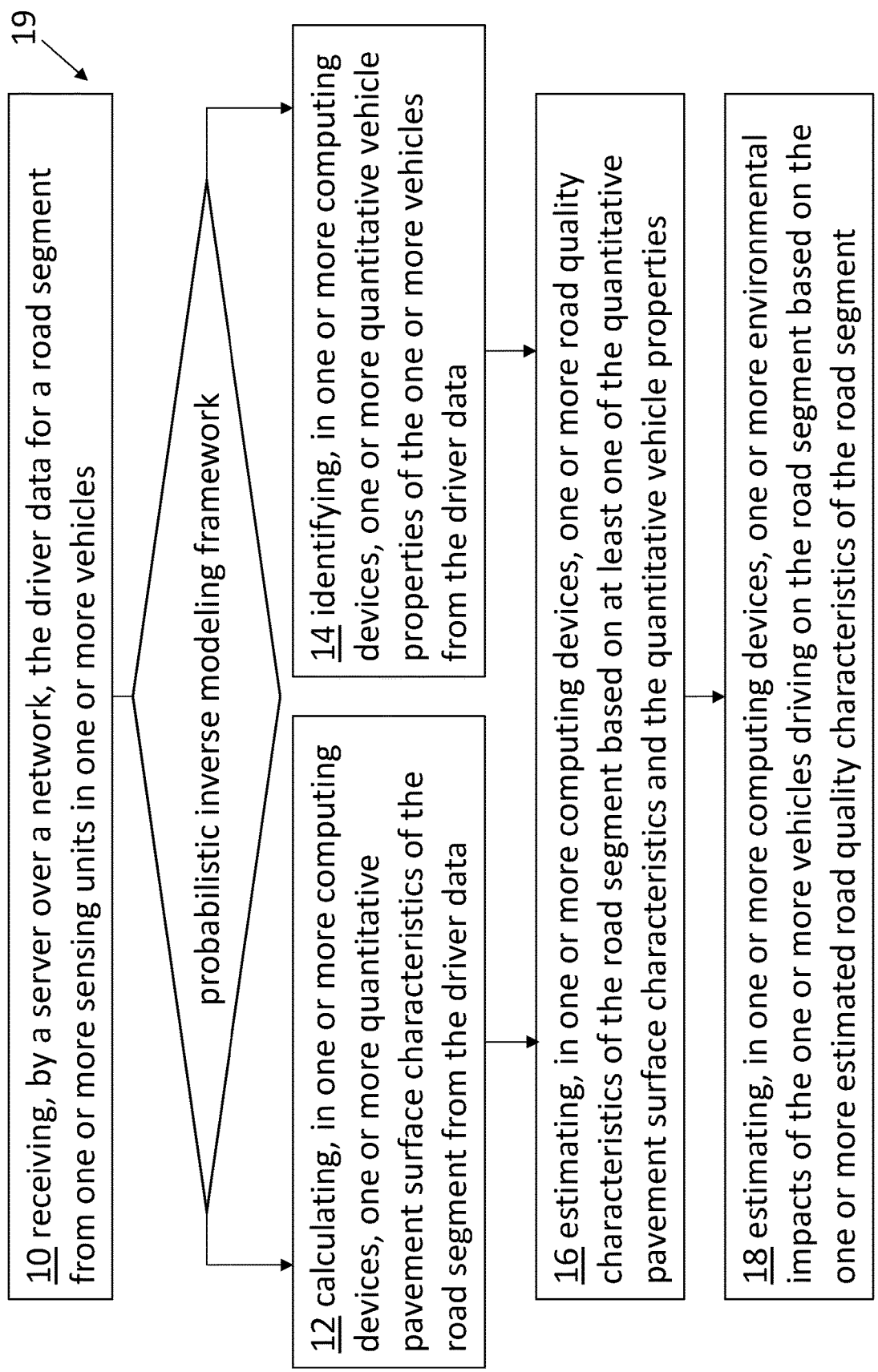
FIG. 2 is a flowchart illustrating a method of monitoring quality of a road segment from driver data.

Accordingly, with simultaneous reference to FIG. 2, which depicts a flowchart of the method 19 of monitoring surface quality of a road segment, the method 19 includes, at step 10, receiving, by the server 1 over the network 5, the driver data 2 for a road segment from the one or more sensing units 3 in the one or more vehicles 4. The driver data 2 from each of the one or more vehicles 4 are gathered in a crowd-sourced collaborative system in the server 1. The server 1 may comprise a computing device 6, which comprises a probabilistic inverse analysis framework 7 for aggregating the driver data 2 for system identification of both pavement surface characteristics 8 and various vehicle properties 9 of the one or more vehicles 4. Alternatively, the computing device 6 may be independent from the server 1, as depicted in FIG. 1.

As used herein, the term "computing device" and "computer" may be used interchangeably and should be construed broadly to include systems with processors capable of executing instructions. Such instructions may be embodied in software and/or hardware, and/or in any of a variety of computer-readable media, memory, ROM, RAM, etc. Software includes but is not limited to, one or more computer or processor instructions that can be read, interpreted, compiled, and/or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or computer-executable instructions can be located in one logic or distributed between two or more communicating, co-operating, or parallel processing logics and thus can be loaded or executed in series, parallel, massively parallel and/or other manners.

The probabilistic inverse analysis framework 7 may be executed as software or hardware (or the like) within the computing device 6. The framework 7 may be provided on any of a variety of computer-readable media.

The probabilistic inverse analysis framework 7 is configured to calculate one or more quantitative pavement surface characteristics 8 of the road segment based on the gathered driver data 2 received from the one or more vehicles 4 driving on the road segment. The probabilistic inverse analysis framework 7 is also configured to identify one or more quantitative vehicle properties 9 of the one or more vehicles 4 driving on the road segment based on the respective driver data 2 that is received.

By moving from the observed data to predict the parameters that were involved in producing that data, the framework 7 operates as an inverse analytical approach. The framework 7 is probabilistic, for instance utilizing a Bayesian analysis, as described further below. It should be appreciated that the inverse analysis may involve determination of any of a variety of parameters, using any of a variety of probabilistic frameworks and that the specific embodiments described herein are only examples of some of the possible ways of executing the framework 7.

Accordingly, using the probabilistic inverse analysis framework, the method 19 includes both, in step 12, calculating, in one or more computing devices, one or more quantitative pavement surface characteristics of the road segment from the driver data and, in step 14, identifying, in the one or more computing devices, one or more quantitative vehicle properties of the one or more vehicles from the driver data.

Figure 3:
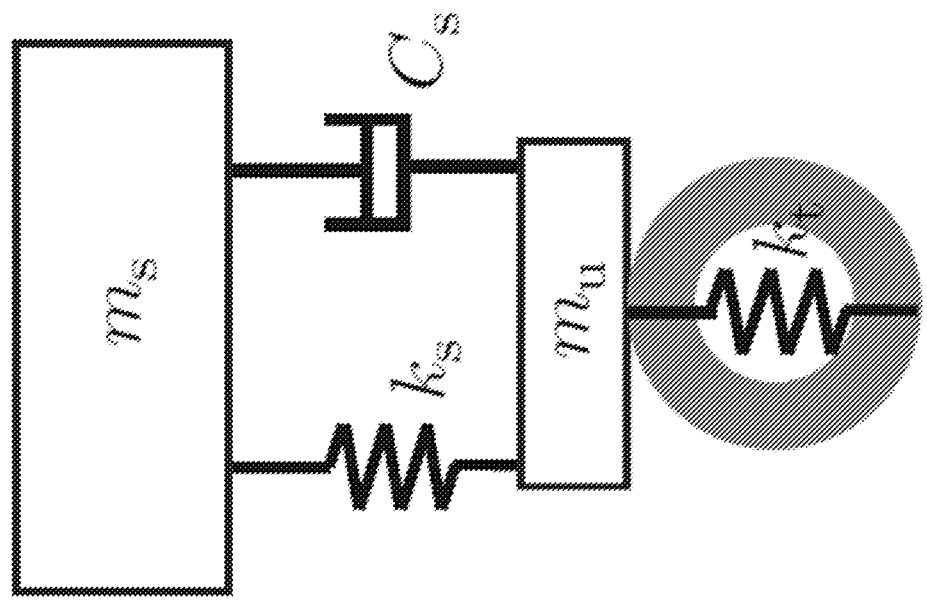
FIG. 3 is a schematic diagram of a quarter-car model.

In an embodiment, and for the examples used herein, the one or more quantitative pavement surface characteristics 8 include road roughness PSD of the road segment. For any given road segment, pavement surface roughness may induce motion, particularly vertical acceleration, of a car, which may be modeled using the standard quarter-car model, depicted in FIG. 3, or other vehicle dynamics models. The term "car," as used herein, should be understood as applying broadly to road-traveling vehicles, including, for instance, automobiles, trucks, and motorcycles. Considering, therefore, the quarter-car model, a 2 degree-of-freedom (2DOF) system has sprung and unsprung masses, $m_s$ and $m_u$, connected by a parallel spring-dashpot system of stiffness $k_s$ and damping coefficient $C_s$ representative of the suspension system. The spring of stiffness $k_t$ represents the tire that connects the unsprung mass to the pavement surface of longitudinal profile $\xi(x)$.

As described below, measurements from the acceleration of the sprung mass $\ddot{y}_s$, may be used to find the corresponding PSD, $S_{\ddot{y}_s}(\omega)$. For example, from fundamentals of random vibrations, the PSD, $S_{\ddot{y}_s}(w)$, of acceleration of sprung mass, $\ddot{y}_s$, in the vertical direction, may be calculated by:

$$S_{\ddot{y}_s}(\omega) = |H_{\ddot{y}_s}(\omega)|^2 S_\xi(\omega)$$

where $H_{\ddot{y}_s}(\omega)$ is a frequency response function of the car, which depends on various vehicle properties, and $S(\omega)$ is the temporal PSD of the road surface, which is related to the spatial PSD of road roughness ($S_\xi(\Omega)$ via $S_\xi(\Omega)=V_0 S_\xi(\omega)$) with $V_0$ being the vehicle speed. The spatial PSD of road roughness, (SO)) is usually expressed as a power function $S_\xi(\Omega)=c\Omega^{-w}$ where c is the unevenness index and w is the waviness number.

Measurements from the acceleration of sprung mass, $\ddot{y}_s$, may be used not only to find the road PSD parameters c and w, but may also be used to identify the various quantitative vehicle properties 9 including, as non-limiting examples, $\omega_s$ (natural frequency of the sprung mass), γ (ratio of unsprung mass to sprung mass), β (unsprung to sprung frequency ratio) and ζ (damping ratio). Other examples of quantitative vehicle properties 9 include the ratio of stiffness of tire $k_t$ to stiffness of the suspension $k_s$ ($\bar{k}=k_t/k_s$) and the sprung mass ($m_s$). The probabilistic inverse analysis framework 7, therefore, incorporates the above calculations to identify the road roughness parameters c and w (used to calculate PSD as a pavement surface characteristic) and the quantitative vehicle properties (e.g. $\omega_s$, γ, β and ζ), as well as the car speed $V_0$, based on the driver data 2.

Probabilistic inverse analysis methods consider the uncertainty of the input data to infer the distributions of the model parameters rather than a single value for each parameter. The uncertainty of the inferred model/parameters can then be incorporated into the system response prediction process, such as the prediction of fuel consumption, as will be described later. Moreover, the global approach to solve a probabilistically formulated inverse problem, guarantees identifying distributions of the model parameters that best match the measured system response, considering the sources of uncertainty.

In an embodiment, the probabilistic inverse analysis framework 7 may be, for example, a mechanistic-Bayesian inverse analysis framework. In Bayesian model identification, the model parameters are assumed to follow a probability distribution, rather than being a fixed certain value. Accordingly, prior belief about the parameters is updated based on the information obtained from the system response to form the posterior distribution of the model parameters. This can be summarized using the Bayes formula as:

$$p(\theta \mid D, D) = \frac{p(D \mid \theta, D) \times p(\theta)}{p(D \mid D)}$$

in which p(D|θ, D) is the likelihood function, and represents the likelihood of observing D, the system response, given the model parameters θ, p(θ) is the prior distribution of the model parameters, representing the prior belief about the parameters, and p(θ|D, D) is the posterior distribution of the model parameters given the data. p(D|D) is marginalized likelihood, or the model evidence. In the present application, for example, θ is the set of car and road profile parameters and D is the Fourier transformation of the measured acceleration.

For many likelihood functions, direct calculation of the posterior is not tractable. Therefore, sampling methods such as Markov Chain Monte Carlo (MCMC), are used to explore the distribution of the posterior (up to a proportionality constant). This is done to avoid computing the evidence, as it is the parameters that are of interest. Since the samples are drawn from a distribution similar to the posterior, not exactly the posterior, the probability distribution of the parameters cannot be identified but the most likely values of the parameters may be stated, as the location of the modes and the relative frequency in the calculated posterior are the same as the actual posterior.

Figure 4:
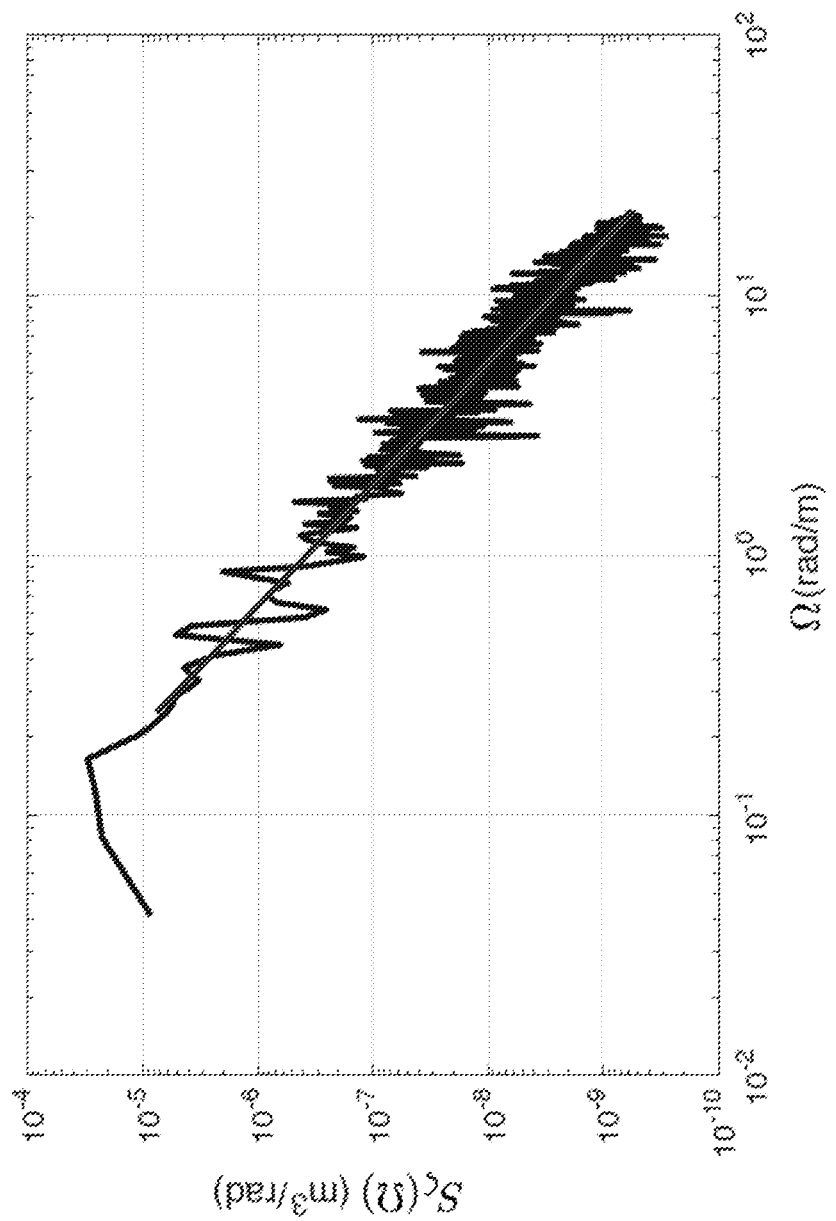
FIG. 4 is an exemplary output of road surface PSD.

Road roughness PSD is a detailed and quantitative description of the road segment surface in the form of a table of wavelengths and their numerical weight/strength in the road surface profile. This table can also be visualized, for example, in the form of a graph of magnitude/strength $S_\xi(\Omega)$ vs. wavelength as depicted in FIG. 4. In FIG. 4 the wavy line represents the real road roughness PSD and the straight line is the smooth estimated power function (linear function in a log-log plot) of the roughness PSD obtained from the inverse analysis framework. This detailed description represents fundamental properties of the road surface.

The method 19 further includes, at step 16, estimating, with a mechanics-based estimator 13 in the one or more computing devices, one or more road quality characteristics 11, of the road segment based on at least one of the quantitative pavement surface characteristics 8 of the road segment and the quantitative vehicle properties 9 of the one or more vehicles. In an embodiment, the road quality characteristics 11 may be estimated directly from the pavement surface characteristics 8.

It will be appreciated that the pavement surface characteristics 8 and/or the road quality characteristics 11 may be presented to users in any of a variety of ways. To give non-limiting examples, the pavement surface characteristics 8 and/or the road quality characteristics 11 may be presented for multiple segments, such as making up parts of a road network in a geographic area, in the form of a table or a map.

A vehicle driving at constant speed on a rough pavement consumes fuel in excess of the energy required to overcome the aerodynamic drag and motor friction forces. Accordingly, in an embodiment, the road quality characteristic 11 to be estimated may be and/or may include excess fuel consumption. The estimating 16 the road quality characteristics 11 with the mechanics-based estimator may, therefore, include calculating energy dissipation of the one or more vehicles driving on the road segment. The calculated energy dissipation may be representative of excess fuel consumption 11, and relatedly, fuel efficiency of the one or more vehicles. The mechanistic-based estimator 13 of the present invention may be capable of capturing different sources of energy dissipation; namely the dissipation due to time-dependent deformation of the surface layer, often referred to as "deflection-induced dissipation"; and energy dissipation in vehicle suspension system induced by the road surface roughness.

Using mathematical methods such as perturbation and asymptotic analysis, the mechanistic-based estimator 13 for calculating the road roughness-induced energy dissipation, per distance traveled in terms of car properties and the PSD parameters may be stated as:

$$E[\delta\epsilon] = \frac{cV_0^{w-2}\pi k_s}{2}\left(\frac{k_s}{m_s}\right)^{1-\frac{w}{2}}\left(1 + \left(\frac{\bar{k}}{\gamma}\right)^{1-\frac{w}{2}}\left(\bar{k} - \frac{w}{2}\right)\right)$$

where c and w are the road PSD parameters, i.e. unevenness index and waviness number, $k_s$ is the suspension stiffness and $m_s$ is the sprung mass.

Such energy dissipation may be determined on a car-by-car basis, using the vehicle properties 9 that are also provided by the framework 7. The energy dissipation may be summed over the vehicles that provide data. Energy dissipation may also be extrapolated to a hypothetical group of vehicles, for example using typical vehicle characteristics, either input or derived from the output vehicle properties 9 from the framework 7 to estimate the accumulated energy dissipation for a road segment or roadway network.

In another embodiment, the road quality characteristic 11 to be estimated may be ride quality and the estimating 16 the road quality characteristics 11 may, therefore, include calculating one or more ride quality indices, such as, for example, the International Roughness Index (IRI). IRI as a function of road roughness PSD, for example, may be calculated with the equation:

$$E[IRI] = 0.309\kappa(1.6713)^w\sqrt{c\left(1 + 68.773\left(10.316 - \frac{w}{2}\right)0.1206^w\right)}$$

The above equation shows that IRI is a function of at least two roughness PSD parameters (c, w), which are separately required to calculate the associated energy dissipation, as described earlier. In addition, linking IRI to these PSD parameters requires knowledge of the multiplying factor κ, which by definition is a function of the probability distribution of the relative suspension motion 2. For instance, a Gaussian roughness profile results in a normally distributed suspension motion with $\kappa = \sqrt{(2/\pi)}$.

The method 19 may then further include, in step 18, estimating, using an environmental impact estimator 17 in the one or more computing devices 6, one or more environmental impacts 15 of the one or more vehicles 4 driving on the road segment based on the one or more estimated pavement surface characteristics 8 of the road segment and the one or more estimated vehicle properties 9. For example, the environmental impact 15 may be caused by the $CO_2$ or other greenhouse gas emissions of the one or more vehicles 4 caused by driving on the road segment, in which case the method may include estimating, using the environmental impact estimator 17, an excess $CO_2$ emission of the one or more vehicles caused by driving on the road segment. Accordingly, for any given road segment, the method 19 may estimate a number of environmental impacts 15 of the road segment's surface condition by estimating various factors related to, for example, fuel consumption, such as excess $CO_2$ emission.

The method 19 may then include reporting at least one of the road quality characteristics 11, the environmental impacts 15, the quantitative pavement surface characteristics 8 and the quantitative vehicle properties 9, in real time. For example, one or more of the above-described outputs of the method 19 may be displayed on an evolving display which indicates the quality of the road segment in real time, as driver data 4 is being received and the above-described outputs (i.e., quantitative vehicle properties 9, pavement surface characteristics 8, road quality characteristics 11, and environmental impact 15) are being calculated and/or estimated. Alternatively, the above-described outputs may be reported in pre-determined time increments. Accordingly, continuous, real-time monitoring of road segment quality may be achieved.

The method 19 of the present invention is capable of computing the above-mentioned outputs using data from vehicles of any type, make, model, etc. by identifying the quantitative properties 9 of each vehicle. Additionally, the present invention is insensitive to the speed of the vehicles used. It can measure the above-mentioned outputs using one or more vehicles of any type, driving at any speed.

Real-time monitoring of road segment quality may be of particular interest to consumers or in markets related to pavement maintenance. This consists mostly of government administrations at the city, state, regional, and national levels, such as departments of transportation and highway authorities. It also contains private pavement management entities, such as tollway managers. The method 19 advantageously provides these entities with a less costly alternative to monitoring the quality of roadways in order to make informed maintenance decisions based on quantitative road quality data. Accordingly, in an embodiment, the method 19 may further include using at least one of the one or more road quality characteristics, the one or more environmental impacts, the one or more quantitative pavement surface characteristics, and the one or more quantitative vehicle properties to make a road maintenance decision. For example, in an embodiment, the road roughness PSD may be considered in making road maintenance decisions by identifying which road segments have the highest road roughness, indicating poor quality. Maintenance decisions may therefore be made to repair roads with quality below a certain threshold. Alternatively, ride quality may be considered when making road maintenance decisions by identifying which road segments have the best and worst ride quality for vehicles driving down the road segment. Maintenance decisions may be made to repair or maintain road segments with road quality below a certain threshold. In another embodiment, excess fuel consumption may be considered when making road maintenance decisions by identifying which road segments lead to the highest excess fuel consumption. Maintenance decisions may therefore be made to repair or maintain the road segments that lead to excess fuel consumption beyond a certain threshold. These are to be considered non-limiting examples of using the above-mentioned outputs to make road maintenance decisions. Various other examples and applications may be envisioned by one having ordinary skill in the art.

Other markets and consumers that may be benefitted from the method 19 include those involved in measuring fuel consumption for product development or other purposes such as those related to carbon tax, e.g., vehicle manufacturers, or other entities that are required to measure pavement condition related fuel consumption, such as infrastructure developers, or movement management companies. Accordingly, in another embodiment, the method 19 may further include using at least one of the one or more road quality characteristics, the one or more environmental impacts, the one or more quantitative pavement surface characteristics, and the one or more quantitative vehicle properties for product development purposes. For example, vehicle manufacturers may consult the method 19 and one or more of the above-mentioned outputs in developing fuel efficient vehicles and various features of vehicles contributing to fuel efficiency. Infrastructure developers may consult the method 19 and the above-mentioned outputs when making infrastructure development decisions, including where and how to build roads, materials for roads, etc. These are to be considered non-limiting examples of using the above-mentioned outputs for product development purposes. Various other examples and applications may be envisioned by one having ordinary skill in the art.

The transportation industry may also be interested in the advantages of the present invention in order to optimize their routes for trip quality and comfort and to reduce potential damage to transported goods. Accordingly, in another embodiment, the method 19 may further include using at least one of the one or more road quality characteristics, the one or more environmental impacts, the one or more quantitative pavement surface characteristics, and the one or more quantitative vehicle properties to optimize a transportation route. For example, transportation companies may create their transportation routes based on which road segments have good quality over other others, thereby choosing the best route available, considering road roughness, ride quality/comfort, and fuel efficiency. These are to be considered non-limiting examples of using the above-mentioned outputs to optimize a transportation route. Various other examples and applications may be envisioned by one having ordinary skill in the art.

In a second aspect of the invention, a system for carrying out a method of monitoring quality of a road segment from driver data is provided.

In a third aspect of the invention, a non-transitory computer-readable medium for carrying out functions of the method of monitoring quality of a road segment from driver data is provided.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of monitoring quality of a road segment from driver data, the method comprising:
   receiving, by a server over a network, the driver data for a road segment from one or more sensing units in one or more vehicles,
   calculating, in one or more computing devices, one or more quantitative pavement surface characteristics of the road segment from the driver data using a probabilistic inverse analysis framework,
   identifying, in the one or more computing devices, one or more quantitative vehicle properties of the one or more vehicles from the driver data using the probabilistic inverse analysis framework,
   estimating, in the one or more computing devices, one or more road quality characteristics of the road segment based on at least one of the quantitative pavement surface characteristics of the road segment and the quantitative vehicle properties of the one or more vehicles.

2. The method of claim 1, wherein the estimating the one or more road quality characteristics comprises calculating the International Roughness Index for the road segment, and the one or more road quality characteristics comprises ride quality.

3. The method of claim 1, wherein the estimating the one or more road quality characteristics comprises calculating an energy dissipation of the one or more vehicles driving on the road segment, and the one or more road quality characteristics comprises excess fuel consumption.

4. The method of claim 1, wherein the one or more road quality characteristics is estimated via a mechanics-based estimator in the one or more computing devices.

5. The method of claim 1, further comprising estimating, in the one or more computing devices, one or more environmental impacts of the one or more vehicles driving on the road segment based on the one or more qualitative pavement surface characteristics of the road segment and the one or more qualitative vehicle properties.

6. The method of claim 5, wherein the estimating the one or more environmental impacts comprises estimating an excess $CO_2$ emission of the one or more vehicles caused by driving on the road segment.

7. The method of claim 5, wherein the one or more environmental impacts is estimated via an environmental impact estimator in the one or more computing devices.

8. The method of claim 5, further comprising reporting at least one of the one or more road quality characteristics, the one or more environmental impacts, the one or more quantitative pavement surface characteristics, and the one or more quantitative vehicle properties.

9. The method of claim 5, further comprising using at least one of the one or more road quality characteristics, the one or more environmental impacts, the one or more quantitative pavement surface characteristics, and the one or more quantitative vehicle properties to make a road maintenance decision.

10. The method of claim 5, further comprising using at least one of the one or more road quality characteristics, the one or more environmental impacts, the one or more quantitative pavement surface characteristics, and the one or more quantitative vehicle properties for product development purposes.

11. The method of claim 5, further comprising using at least one of the one or more road quality characteristics, the one or more environmental impacts, the one or more quantitative pavement surface characteristics, and the one or more quantitative vehicle properties to optimize a transportation route.

12. The method of claim 1, wherein the probabilistic inverse analysis framework is a mechanistic-Bayesian inverse analysis framework.

13. The method of claim 1, wherein the one or more quantitative pavement surface characteristics comprises road roughness PSD of the road segment.

14. The method of claim 1, wherein the driver data comprises one or more of vertical acceleration data and geolocation data.

15. The method of claim 1, wherein the one or more sensing units comprises one or more of an accelerometer and a GPS sensor.

16. The method of claim 1, wherein the receiving the driver data comprises gathering the driver data in a crowd-sourced collaborative system in the server.

17. A system configured to carry out the method of claim 1.

* * * * *